US008454219B2

(12) United States Patent
Byoun et al.

(10) Patent No.: US 8,454,219 B2
(45) Date of Patent: Jun. 4, 2013

(54) BACKLIGHT UNIT AND DISPLAY APPARATUS INCLUDING THE SAME

(75) Inventors: Dae-hyoun Byoun, Seoul (KR);
 Myeong-kuk Jin, Hwaseong-si (KR);
 Jun-seok An, Suwon-si (KR);
 Seung-bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 12/626,094

(22) Filed: Nov. 25, 2009

(65) Prior Publication Data
US 2010/0128465 A1 May 27, 2010

(30) Foreign Application Priority Data

Nov. 27, 2008 (KR) .................. 10-2008-0118642
Oct. 22, 2009 (KR) .................. 10-2009-0100591

(51) Int. Cl.
 *G02F 1/13357* (2006.01)
(52) U.S. Cl.
 USPC .................... 362/613; 362/612; 362/97.3
(58) Field of Classification Search
 USPC .................. 362/608, 612, 613, 615, 97.3
 See application file for complete search history.

(56) References Cited

U.S. PATENT DOCUMENTS

| | | | | |
|---|---|---|---|---|
| 5,831,701 | A | * | 11/1998 | Matsuyama et al. .......... 349/110 |
| 2005/0105013 | A1 | * | 5/2005 | Nakagawa et al. ............. 349/58 |
| 2008/0094855 | A1 | * | 4/2008 | Yu et al. ....................... 362/634 |
| 2009/0097277 | A1 | * | 4/2009 | Iwasaki ........................ 362/628 |
| 2009/0237957 | A1 | * | 9/2009 | Tsubaki ........................ 362/615 |

FOREIGN PATENT DOCUMENTS

| | | | |
|---|---|---|---|
| EP | 1655536 A1 | * | 5/2006 |
| KR | 10-2007-0122333 A | | 12/2007 |
| WO | 2009122603 A1 | | 10/2009 |
| WO | WO 2009122603 A1 | * | 10/2009 |

OTHER PUBLICATIONS

Pan, Susan Perng, "Appealing a Rejection at the Board: Analysis of Recent Board Decisions and Non-Appeal Alternatives", Journal of the Patent and Trademark Office Society, Nov. 2003, pp. 853-869.*
Communication dated Mar. 23, 2012 issued by the European Patent Office in counterpart European Patent Application No. 09176954.7.

* cited by examiner

*Primary Examiner* — David V Bruce
(74) *Attorney, Agent, or Firm* — Sughrue Mion, PLLC

(57) ABSTRACT

A backlight unit and a display apparatus including the backlight unit are provided. The backlight unit includes: a light source unit which includes at least one light source which emits light, and a gap maintaining unit; a light guiding plate which guides the light emitted from the light source; and an elastic member which elastically biases the light source unit toward the light guiding plate so that the gap maintaining unit maintains a gap between the light source and the light guiding plate.

23 Claims, 9 Drawing Sheets

BACKLIGHT UNIT AND DISPLAY APPARATUS INCLUDING THE SAME

CROSS-REFERENCE TO RELATED APPLICATIONS

This application claims priority from Korean Patent Application No. 10-2008-0118642, filed on Nov. 27, 2008, and Korean Patent Application No. 10-2009-0100591 filed on Oct. 22, 2009, the disclosures of which are incorporated herein by reference.

BACKGROUND

1. Field

Apparatuses consistent with the exemplary embodiments relate to a backlight unit and a display apparatus including the same, and more particularly, to a backlight unit which provides necessary light by maintaining a gap between a light source unit and a light guiding plate regardless of expansion or contraction of the light guiding plate due to heat, and a display apparatus including the same.

2. Description of the Related Art

Backlight units may be classified as a direct type backlight unit and an edge type backlight unit depending on a location of a light source.

The direct type backlight unit has a light source disposed below a liquid crystal panel so that the light source emits light directly to the liquid crystal panel. The direct type backlight unit includes a reflection plate which is located under a lamp to reflect light, and an optical sheet which is disposed above the lamp to focus and diffuse the emitted light. As the direct type backlight unit may include a plurality of light sources and provide high efficiency in using light, it is mainly employed in a large-screen liquid crystal display (LCD) device that requires high brightness.

An edge type backlight unit typically has a light guiding plate disposed at a lateral side of a light source to guide light from a light source to a liquid crystal panel. The edge type backlight unit has a lower brightness when employed in a large-screen liquid crystal display device, but is advantageous in a thin display device. The light guiding plate diffuses light to make it uniform. Below the light guiding plate is provided a reflection plate. Above the light guiding plate, a pair of prism sheets which convert a path of light, and a diffusion sheet which reinforces uniformity of light incident to the liquid crystal panel are formed.

Generally, the light guiding plate includes polymer methyl methacrylate (PMMA). The PMMA expands and contracts in reaction to changes in temperature and moisture, and has a large expansion coefficient among other plastic materials.

In case of a large backlight unit, a light emitting diode (LED) employed as a light source should be as close to the light guiding plate as possible to provide sufficient light. The greater the gap between the LED and the light guiding plate is, the lower light efficiency is. If an LED is employed in an edge type backlight unit have a size greater than 40 inches, the size of the light guiding plate also increases. Thus, changes in the size of the light guiding plate (i.e., expanding or contracting) due to heat or moisture increases. If the LED is closely provided to the light guiding plate for light efficiency, the light guiding plate expands in a high-temperature operation environment and contacts the LED. On the contrary, if the gap between the LED and the light guiding plate increases to solve the foregoing issue, it is difficult to provide necessary light.

SUMMARY

One or more exemplary embodiments provide a backlight unit capable of maintaining the brightness of a light source irrespective of deformation of a light guiding plate, and a display apparatus including the same.

According to an aspect of an exemplary embodiment, there is provided a backlight unit including: a light source unit which includes at least one light source which emits light, and a gap maintaining unit; a light guiding plate which guides the light emitted from the light source; and an elastic member which elastically biases the light source unit toward the light guiding plate so that the gap maintaining unit maintains a constant gap between the light source and the light guiding plate The light source unit may further include a point light source and a point light source substrate on which the point light source is disposed, wherein the gap maintaining unit extends from the point light source substrate to the light guiding plate.

The gap maintaining unit may be integrally formed with the point light source substrate.

A section of the point light source substrate and the gap maintaining unit may have at least one of a U-shape, an L-shape and a ⊢-shape.

The backlight unit may further include an accommodation member which accommodates the light source unit and the light guiding plate, wherein the elastic member is coupled to and disposed between the accommodation member and the light source unit.

The elastic member may further include at least one of a coil spring, a rubber, a graphite tape, a graphite sheet and a sponge.

The light source may be arranged along a lateral side of the light guiding plate.

The light source may comprise a light emitting diode.

According to aspect of another exemplary embodiment, there is provided a display apparatus including: a video receiver which receives a video signal; a signal processor which processes the received video signal; a display panel which displays an image based on the processed video signal; and a backlight unit which provides light to the display panel, the backlight unit including: a light source unit which includes at least one light source which emits light, and a gap maintaining unit; a light guiding plate which guides the light emitted from the light source; and an elastic member which elastically biases the light source unit toward the light guiding plate so that the gap maintaining unit maintains a gap between the light source and the light guiding plate.

BRIEF DESCRIPTION OF THE DRAWINGS

The above and/or other aspects will become apparent and more readily appreciated from the following description of the exemplary embodiments, taken in conjunction with the accompanying drawings of which.

DETAILED DESCRIPTION OF EXEMPLARY EMBODIMENTS

Hereinafter, exemplary embodiments will be described with reference to accompanying drawings, wherein like numerals refer to like elements and repetitive descriptions will be avoided as necessary.

Figure 1A:
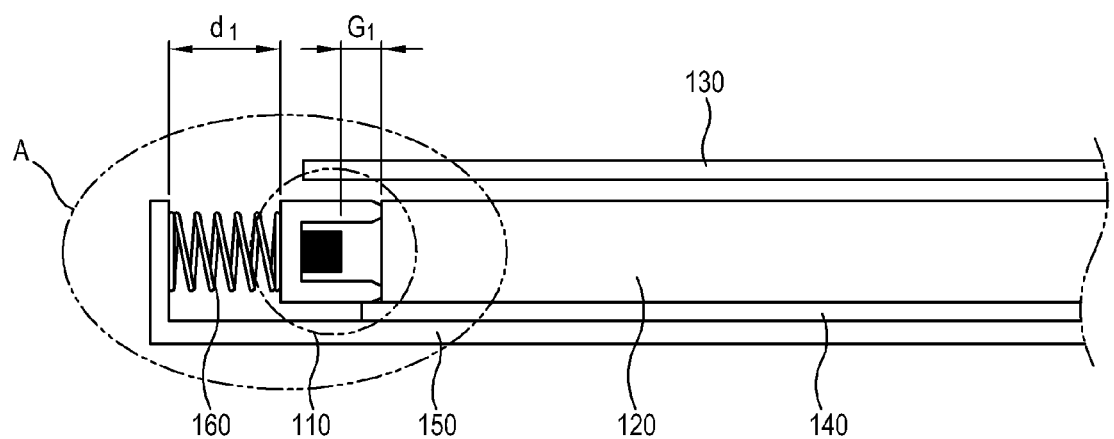
FIGS. 1A and 1B are sectional views which illustrate contraction of an elastic member depending on deformation of a light guiding plate of a backlight unit according to an exemplary embodiment.
Figure 1B:
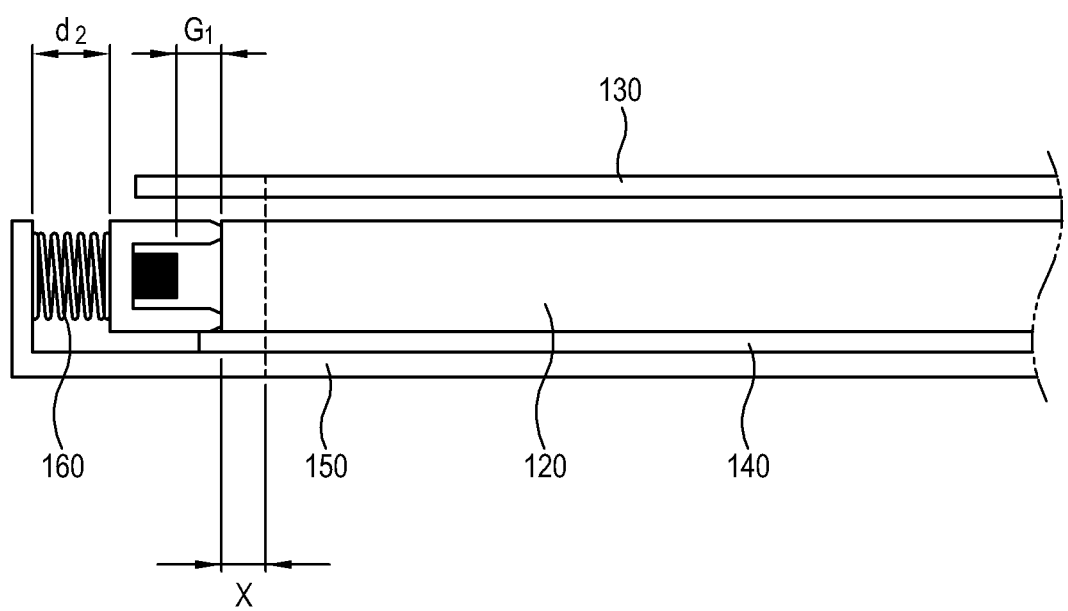

FIGS. 1A and 1B are sectional views of a backlight unit according to an exemplary embodiment, and illustrate contraction of an elastic member depending on deformation of a light guiding plate.

As shown therein, a backlight unit according to the present exemplary embodiment includes a light source unit 110, a light guiding plate 120, an optical sheet 130 provided above the light guiding plate 120, a reflection plate 140 provided below the light guiding plate 120 and an accommodation member 150 accommodating the foregoing elements. The backlight unit further includes an elastic member 160 which is provided between the accommodation member 150 and the light source unit 110. The backlight unit according to the present exemplary embodiment is an edge type where the light source unit 110 is provided in a row in a specific direction.

The light guiding plate 120 is provided in a lateral side of the light source unit 110 to receive light from the light source unit 110. The light guiding plate 120 includes acrylic resin such as PMMA, and uniformly supplies light from the light source unit 110 to the optical sheet 130. The light guiding plate 120 has a rectangular shape, but not limited thereto. Alternatively, the light guiding plate 120 may have various shapes depending on the shape of a panel receiving light.

The optical sheet 130 may include a diffusion panel, a prism film, a protection film, etc. which are not shown. The optical sheet 130 uniformly diffuses light emitted by the light guiding plate 120.

The reflection plate 140 reflects light incident on a lower part of the light guiding plate 120 back to the optical sheet 130 to be supplied to the light guiding plate 120. The reflection plate 140 may include poly ethylene terephthalate (PET) or poly carbonate (PC) coated with silver or aluminum.

Figure 2:
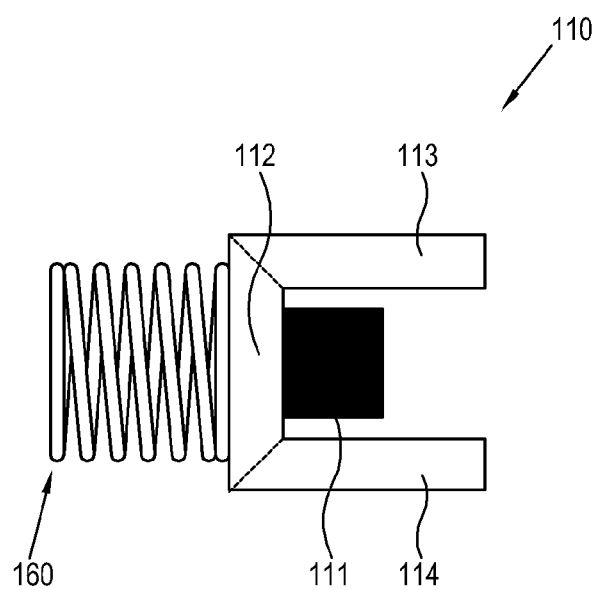
FIG. 2 is a detail view of A in FIG. 1A.

FIG. 2 is an enlarged view of A in FIG. 1A, and specifies the light source unit 110 and the elastic member 160. As shown therein, the light source unit 110 includes a point light source 111 as a light source, a point light source substrate 112 on which the point light source 111 is disposed, and gap maintaining units 113 and 114 extending from the point light source substrate 112. The elastic member 160 is coupled with the light source unit 110 from a lateral side of the light source unit 110.

The point light source 111 is disposed on the point light source substrate 112 shaped like a bar, and includes a plurality of LEDs. The temperature of the point light source 111 may rise to tens of degrees due to light emission. The plurality of LEDs emitting light in different colors may form a group as the point light source 111 and may be provided as an LED emitting white light. The point light source 111 may include a laser diode, etc. other than the LED.

The point light source substrate 112 may include a circuit substrate having a circuit pattern supplying power to the point light source 111, and may include aluminum, which is highly conductive.

The gap maintaining units 113 and 114 extend from the point light source substrate 112 to the light guiding plate 120, and maintain a gap G1 between the light guiding plate 120 and the point light source 111. As shown therein, the gap maintaining units 113 and 114 according to the present exemplary embodiment accommodate the point light source 111 together with the point light source substrate 112, and have a U-shaped (⊏-shaped) section open in a direction of the light guiding plate 120. The gap maintaining units 113 and 114 may be provided integrally with the point light source substrate 112. Alternatively, the point light source substrate 112 and the gap maintaining units 113 and 114 may be coupled to each other.

An end part of the gap maintaining units 113 and 114 extending from the point light source substrate 112 contacts a surface of the light guiding plate 120, and the gap G1 is maintained between the point light source 111 and the light guiding plate 120 by the gap maintaining units 113 and 114. Even if the light guiding plate 120 expands, the gap G1 between the point light source 111 and the light guiding plate 120 provided in an expansion direction of the light guiding plate 120 is maintained by the gap maintaining units 113 and 114. According to the present exemplary embodiment, the gap maintaining units 113 and 114 and the light guiding plate 120 face each other, but are not connected to each other.

The elastic member 160 is provided between the light source unit 110 and the accommodation member 150, and has opposite ends fixed to the light source unit 110 and the accommodation member 150, respectively. The elastic member 160 elastically biases the light source unit 110 toward the light guiding plate 120, and its length changes depending on expansion or contraction of the light guiding plate 120 to support the light source unit 110. If the light guiding plate 120 expands and applies a pressure to the light source unit 110, the elastic member 160 contracts. If the light guiding plate 120 contracts, the elastic member 160 expands and supports the light source unit 110. As shown in FIG. 1A, if a length of the elastic member 160 is d1, the gap between the point light source 111 and the light guiding plate 120 is maintained as the gap G1 by the gap maintaining units 113 and 114. If the light guiding plate 120 expands to the light source unit 110 due to heat and/or moisture and increases in length to X, the elastic member 160 contracts and is reduced to a length d2 shorter than the length d1 as in FIG. 1B, i.e., d2=d1−X. Even if the light guiding plate 120 deforms, the gap between the point light source 111 and the light guiding plate 120 is maintained. On the contrary, if the light guiding plate 120 contracts from the state as in FIG. 1B, the elastic member 160 increases in length to appropriately support the light source unit 110 between the accommodation member 150 and the light guiding plate 120.

Figure 3:
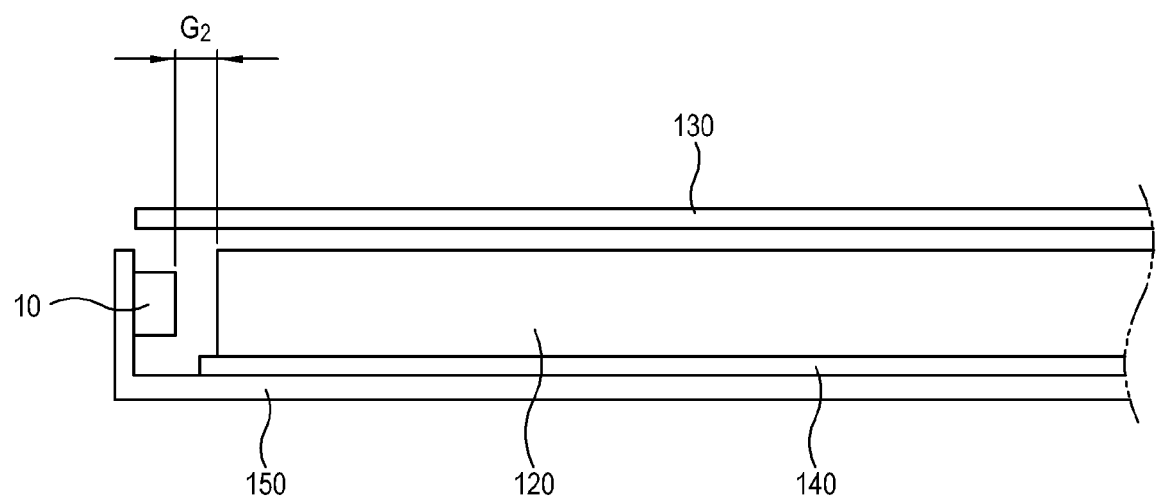
FIG. 3 is a sectional view of a related art backlight unit.

FIG. 3 is a sectional view of a related art backlight unit. As shown therein, a point light source 10 is fixed to an internal part of an accommodation member 150. A gap between the point light source 10 and the light guiding plate 120 is G2 currently, but the gap may change due to contraction or expansion of the light guiding plate 120. That is, the gap between the point light source 10 and the light guiding plate 120 may change in response to deformation of the light guiding plate 120. This means brightness of light changes. If the light guiding plate 120 expands and contacts the point light source 10, the deformation of the light guiding plate 120 and non-uniform brightness due to heat of the point light source 10 may occur.

According to the present exemplary embodiment, the gap between the point light source 111 and the light guiding plate 120 is maintained, and brightness of light emitted to the light guiding plate 120 from the point light source 111 is maintained. In line with deformation of the light guiding plate 120, the light source unit 110 may be supported to move in accordance with the deformation.

The elastic member 160 according to the present exemplary embodiment includes a coil spring. The material and configuration of the elastic member 160 is not limited to the coil spring, and may include a rubber or a sponge as long as it is provided between the light source unit 110 and the accommodation member 150 and elastically biases the light source unit 110. The elastic member 160 may plurally be provided, and should be heat resistant to maintain elasticity with respect to heat of the point light source 111.

According to another exemplary embodiment, the light source may include a line light source such as a lamp or a surface light source instead of the point light source.

According to another exemplary embodiment, gap maintaining units 113 and 114 integrally formed with the point light source substrate 112 may include a clamp to be coupled with the light guiding plate 120.

According to another exemplary embodiment, the backlight unit may be a direct type instead of the edge type. In this case, the backlight unit includes a light guiding plate and a light source unit that is provided in a rear side of the light guiding plate. The backlight unit may further include a gap maintaining unit formed between the light guiding plate and the light source unit, and an elastic member provided between the light source unit and a lower chassis.

Figure 4:
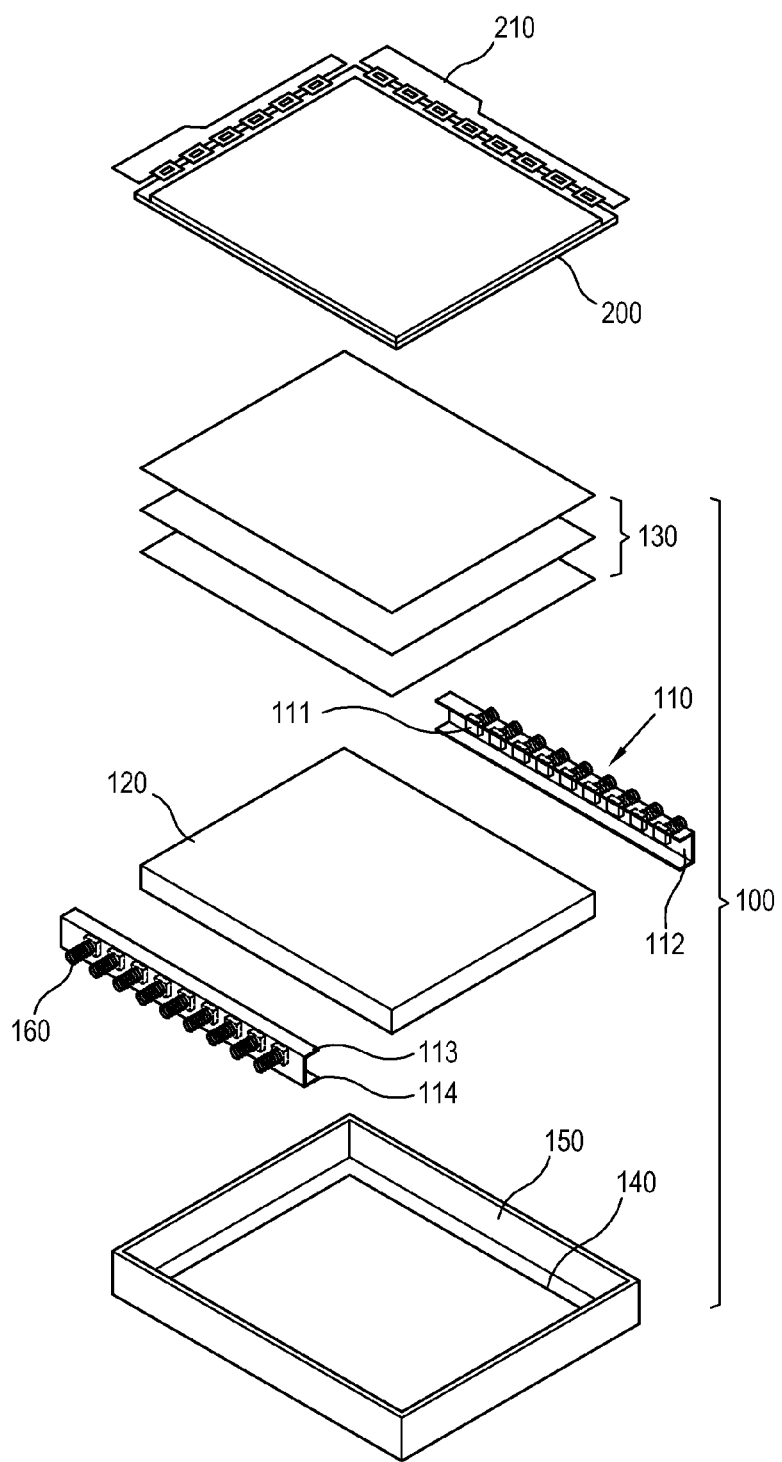
FIG. 4 is a perspective view of a display apparatus according to an exemplary embodiment.
Figure 5:
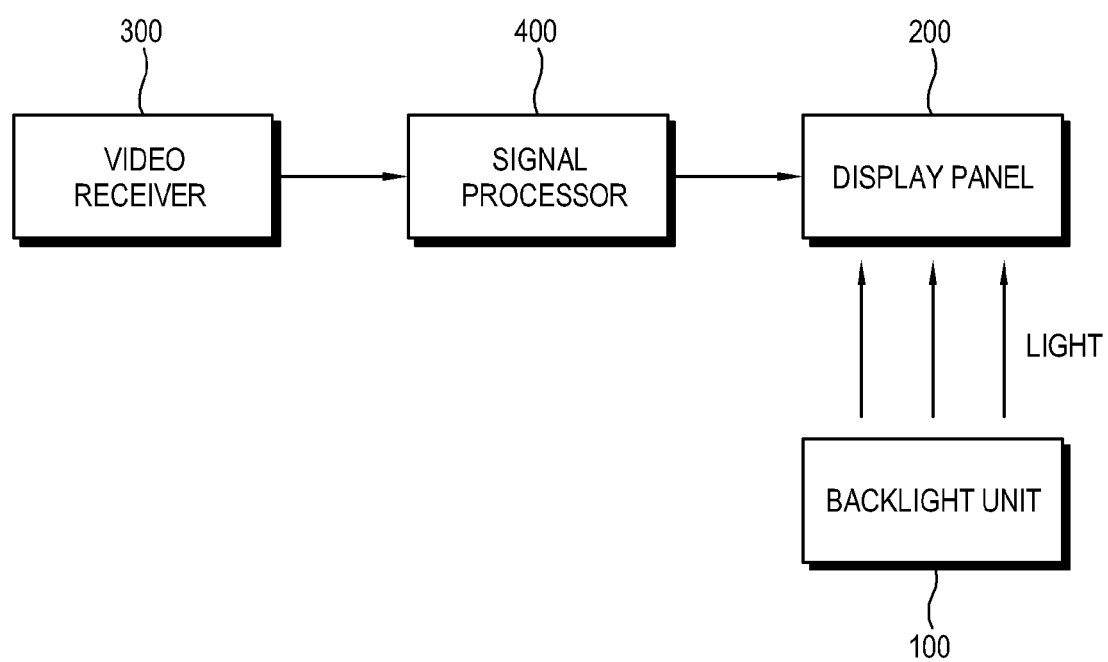
FIG. 5 is a control block diagram of a display apparatus of FIG. 4.

FIG. 4 is a perspective view of a display apparatus according to an exemplary embodiment, and FIG. 5 is a control block diagram of the display apparatus.

As shown therein, the display apparatus includes a display panel 200, and a backlight unit 100 placed under the display panel 200 and emitting light toward the display panel 200, and further includes a video receiver 300 and a signal processor 400.

Referring to FIG. 4, the accommodation member 150 accommodates the reflection plate 140, and the light source unit 110, the light guiding plate 120, the optical sheet 130, and the accommodation member 150 are spaced apart from each other. As shown therein, the light guiding plate 120 is arranged between two point light sources 111, and light emitted from the point light sources 111 is incident to a lateral side of the light guiding plate 120. The elastic member 160 provided between the point light source substrate 112 and the accommodating member 150 elastically biases the light source unit 110 toward the light guiding plate 120. Alternatively, the point light source 111 and the point light source substrate 112 may be arranged along a long lateral side of the light guiding plate 120. Further, the point light source 111 and the point light source substrate 112 may be arranged along the long lateral side of the light guiding plate in addition to the currently shown configurations.

The display panel 200 in this embodiment includes an LCD panel. The display panel 200 displays an image by adjusting molecular arrays in an LCD layer (not shown) sandwiched between two substrates. The display panel 200 employs light emitted from the backlight unit 100 to display an image on a display area. The display panel 200 includes a panel driver 210 to receive and display a video signal. A signal processing block for providing a video signal to the panel driver 210, together with a power block, is embedded on a board (not shown) and accommodated in the accommodation member 150.

The video receiver 300 of FIG. 5 receives a video signal to be displayed as an image on the display panel 200. If a television is used as the display apparatus, the video receiver 300 may receive a radio frequency (RF) signal wirelessly from a broadcasting station (not shown), or receive a video signal based on standards such as composite video, component video, super video, Scart, high definition multimedia interface (HDMI), etc. Also, if a monitor for a computer is used as the display apparatus, the video receiver 300 may receive a video signal based on standards such as DVI, HDMI, D-Sub for transmitting RGB signals of a VGA format, etc.

The signal processor 400 applies various preset processes to a video signal transmitted from the video receiver 300. Here, the types of processes performed in the signal processor 400 are not limited to a certain process. For example, the signal processes may include decoding, encoding, deinterlacing, frame rate conversion, scaling, noise reduction for improving image quality, detail enhancement, etc. The signal processor 400 may be achieved by configurations for individually performing the respective processes, or may be achieved by a single configuration where various functions are integrated.

When the backlight unit 100 performs local dimming, the signal processor 400 may generate a control signal for the local dimming and outputs it to the backlight unit 100. In this case, the backlight unit 100 may include a light source driver (not shown), and a light source controller to control the light source driver by receiving the control signal.

Figure 6:
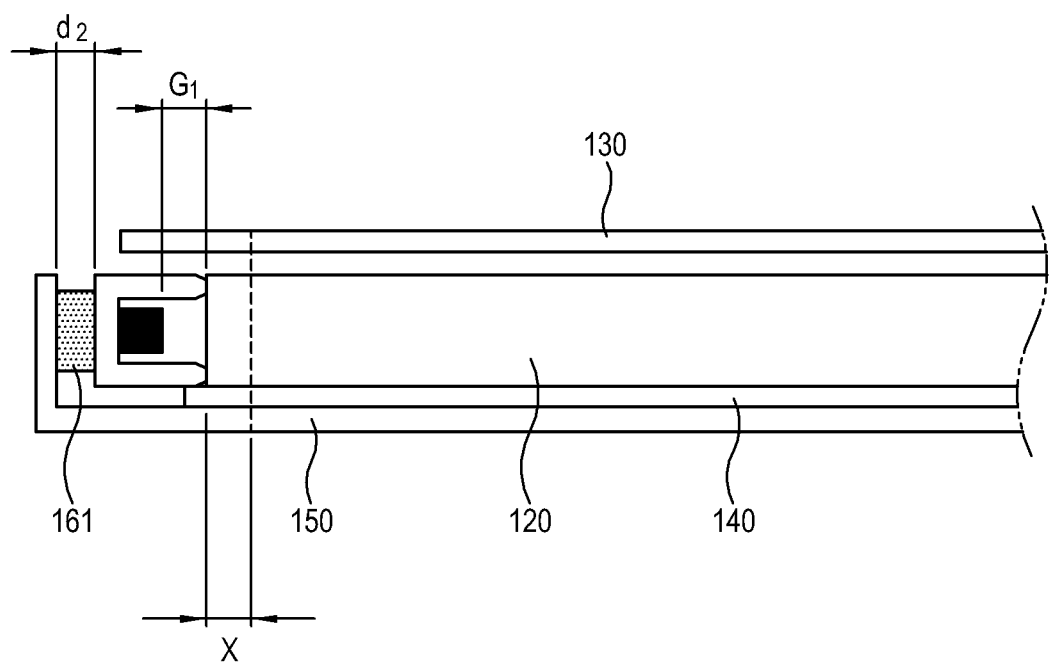
FIG. 6 is a sectional view of a backlight unit according to another exemplary embodiment.

FIG. 6 is a sectional view of a backlight unit according to another exemplary embodiment.

In this embodiment, the backlight unit may include a graphite sheet 161 as an elastic member. The graphite sheet 161 may have a thickness of about 1 mm~3 mm. Graphite is a crystalline form of carbon dimorphous with diamond, which is an electrically conductive and thermally conductive material. The graphite sheet 161 is a natural graphite product refined without additives, which has graphite's own properties such as heat resistance, chemical resistance, etc., is excellent in flexibility, compression resilience, i.e., elasticity, and is available to high temperature. Alternatively, the backlight unit may include a graphite tape instead of the graphite sheet 161. In this case, the graphite tape may be cut from the graphite sheet in a certain width and wrinkled on a surface thereof.

Figure 7:
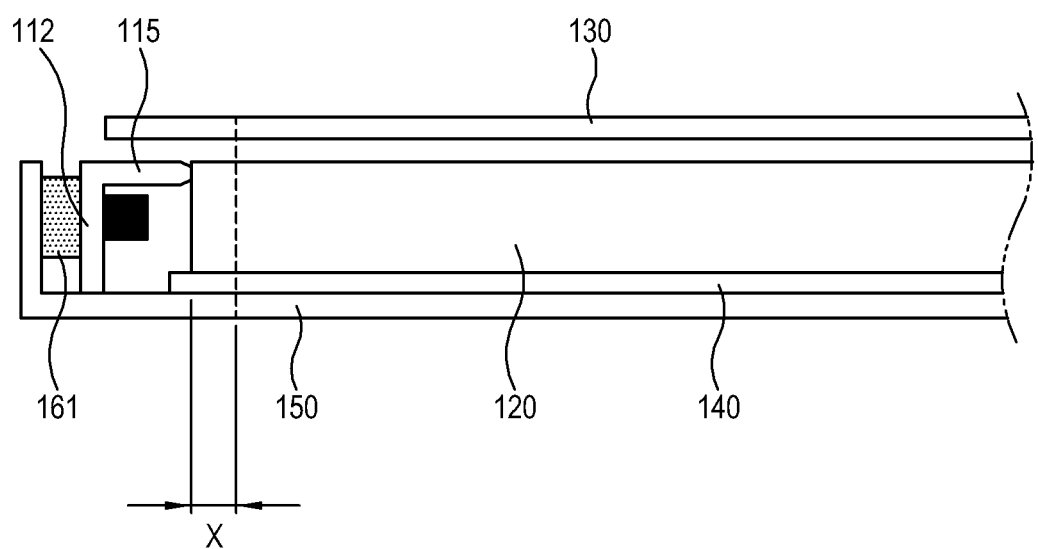
FIG. 7 is a sectional view of a backlight unit according to still another exemplary embodiment.

FIG. 7 is a sectional view of a backlight unit according to still another exemplary embodiment.

In this embodiment, a gap maintaining unit 115 is placed on the point light source 111, and extended from the point light source substrate 112 toward the light guiding plate 120. Here, the point light source substrate 112 and the gap maintaining unit 115 have an L-shaped (⌐-shaped section), but not limited thereto. Alternatively, the point light source substrate 112 and the gap maintaining unit 115 may not have the U-shaped (⊏-shaped) section as long as it can maintain a gap between the point light source 111 and the light guiding plate 120. Thus, the gap maintaining unit 115 may be placed under the point light source 111 and extended from the point light source substrate 112 toward the light guiding plate 120. In this case, the point light source substrate 112 and the gap maintaining unit 115 have an L-shaped (⌐-shaped) section.

Figure 8:
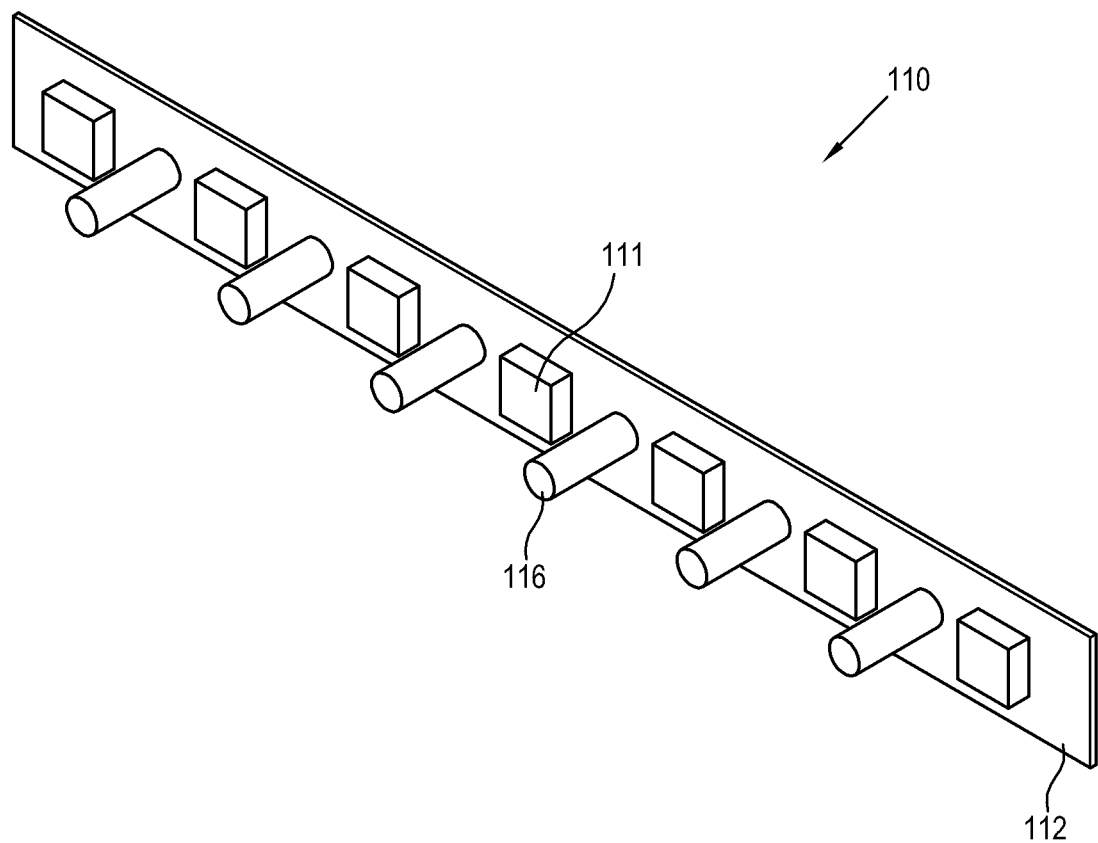
FIG. 8 shows a light source included in the backlight unit according to an exemplary embodiment.

FIG. 8 shows a light source included in the backlight unit according to yet another exemplary embodiment. The light source unit 110 in this embodiment includes a gap maintaining unit 116 protruding between the point light sources 111 toward the light guiding plate 120. That is, the gap maintaining unit 116 is extended not from an edge of the point light source substrate 112 but from the surface of the point light source substrate 112 toward the light guiding plate 120. in this case, the point light source substrate 112 and the gap maintaining unit 116 may have a ⊢-shaped section. The gap maintaining unit 116 may be arranged between every two point light sources 111 as shown in FIG. 8, but not limited thereto. Alternatively, the gap maintaining unit 116 may be arranged between every several point light sources 111. Further, the gap maintaining unit 116 may be shaped like a cylinder or a polygonal pillar.

According to another exemplary embodiment, the point light source substrate 112 and the gap maintaining unit 116 may have at least one of a U-shape, an L-shape and a ⊢-shape.

As described above, according to the exemplary embodiments, there are provided a backlight unit capable of maintaining the brightness of a light source irrespective of deformation of a light guiding plate, and a display apparatus including the same.

Also, according to the exemplary embodiments, there are provided a backlight unit capable of maintaining a gap between a light source unit and a light guiding plate, and a display apparatus including the same.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A backlight unit comprising:
a light source unit which comprises at least one light source which emits light, and a gap maintaining unit;
a light guiding plate which guides the light emitted from the at least one light source; and
an elastic member which elastically biases the light source unit toward the light guiding plate so that the gap maintaining unit maintains a gap between the at least one light source and the light guiding plate.

2. The backlight unit according to claim 1, wherein the light source unit further comprises a point light source and a point light source substrate on which the point light source is disposed, and
the gap maintaining unit extends from the point light source substrate to the light guiding plate.

3. The backlight unit according to claim 2, wherein the gap maintaining unit is integrally formed with the point light source substrate.

4. The backlight unit according to claim 3, wherein a section of the point light source substrate and the gap maintaining unit has at least one of a U-shape, an L-shape and a ⊢-shape.

5. The backlight unit according to claim 4, further comprising an accommodation member which accommodates the light source unit and the light guiding plate,
wherein the elastic member is coupled to and disposed between the accommodation member and the light source unit.

6. The backlight unit according to claim 1, wherein the elastic member comprises at least one of a coil spring, a rubber, a graphite tape, a graphite sheet and a sponge.

7. The backlight unit according to claim 1, wherein the at least one light source is arranged along a lateral side of the light guiding plate.

8. The backlight unit according to claim 1, wherein the at least one light source comprises a light emitting diode.

9. The backlight unit according to claim 1, wherein the gap maintaining unit is configured to releasably contact the light guiding plate in an unfixed manner.

10. A display apparatus comprising
a video receiver which receives a video signal;
a signal processor which processes the received video signal;
a display panel which displays an image based on the processed video signal; and
a backlight unit which provides light to the display panel, the backlight unit comprising:
a light source unit which emits light, and a gap maintaining unit;
a light guiding plate which guides the light emitted from the light source unit; and
an elastic member which elastically biases the light source unit toward the light guiding plate so that the gap maintaining unit maintains a gap between the light source unit and the light guiding plate.

11. The display apparatus according to claim 10, wherein the light source unit further comprises a point light source and a point light source substrate on which the point light source is disposed, and
the gap maintaining unit extends from the point light source substrate to the light guiding plate.

12. The display apparatus according to claim 11, wherein the gap maintaining unit is integrally formed with the point light source substrate.

13. The display apparatus according to claim 11, wherein a section of the point light source substrate and the gap maintaining unit has at least one of a U-shape, an L-shape and a ⊢-shape.

14. The display apparatus according to claim 10, further comprising an accommodation member which accommodates the light source unit and the light guiding plate,
wherein the elastic member is coupled to and disposed between the accommodation member and the light source unit.

15. The display apparatus according to claim 10, wherein the elastic member comprises at least one of a coil spring, a rubber, a graphite tape, a graphite sheet and a sponge.

16. The display apparatus according to claim 10, wherein the light source unit is arranged along a lateral side of the light guiding plate.

17. The display apparatus according to claim 10, wherein the light source unit comprises a light emitting diode.

18. The display apparatus according to claim 10, wherein the gap maintaining unit is configured to releasably contact the light guiding plate in an unfixed manner.

19. A backlight unit comprising:
a substrate;
at least one light source which is disposed on the substrate and emits light;
a light guiding plate which guides the light emitted from the at least one light source;
at least one gap maintaining unit which extends from the substrate toward the light guiding plate and past the at least one light source; and
an elastic member which elastically biases the substrate toward the light guiding plate so that the gap maintaining unit maintains contact with the light guiding plate.

20. The backlight unit according to claim 19, wherein the gap maintaining unit separates the at least one light source from the light guiding plate by a predetermined distance that is maintained by the elastic member.

21. The backlight unit according to claim 20, wherein the light guiding plate is made of material that expands or contracts with changes in temperature.

22. The backlight unit according to claim 21, wherein the elastic member comprises at least one of a coil spring, a rubber, a graphite tape, a graphite sheet and a sponge.

23. The backlight unit according to claim 19, wherein the gap maintaining unit is configured to releasably contact the light guiding plate in an unfixed manner.

* * * * *